June 22, 1965 B. M. MEIJER 3,191,083
SELF-STARTING SINGLE-PHASE MOTOR WITHOUT A COMMUTATOR
Filed Jan. 12, 1962
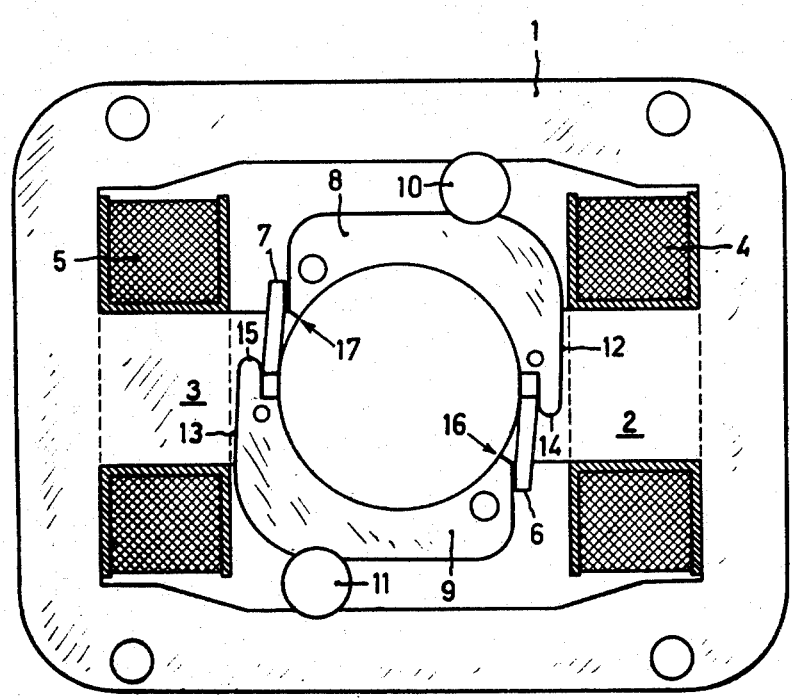
INVENTOR
BAREND M. MEIJER
BY
AGENT United States Patent Office 3,191,083
Patented June 22, 1965

3,191,083
SELF-STARTING SINGLE-PHASE MOTOR
WITHOUT A COMMUTATOR
Barend Martinus Meijer, Dordrecht, Netherlands, assignor to North American Philips Company, Inc., New York, N.Y., a corporation of Delaware
Filed Jan. 12, 1962, Ser. No. 165,887
Claims priority, application Netherlands, Jan. 16, 1961, 260,126
2 Claims. (Cl. 310—172)

Known self-starting single-phase motors without a commutator in which a number of the poles are shaded and another number are not shaded, have a limitation in that the stator field produced by the poles which are not shaded (referred to hereinafter as the main field) is considerably stronger than the field produced by the poles which are shaded (referred to hereinafter as the shaded field). The consequence of this difference in field strength is that the rotational field of said motors is not circular, but mostly elliptical, which may give rise to vibration during operation.

Attempts have previously been made in different ways to obviate, or at least reduce, the difference in strength of the said two fields. In a method suitable to this end, the magnetic circuit is formed into a shape such that the main field is attenuated due to local saturation of the iron of the circuit. However, the said method has the disadvantage that the main field is not only attenuated, but also distorted. Another more suitable method consists in widening the air-gap between stator and rotor at the areas where the main field passes. This method, which renders it possible to obtain a circular and undistorted rotational field has, however, for the manufacture the disadvantage that the sections punched centrally from the stator laminations are not exactly circular and cannot therefore be used for the manufacture of rotors.

The invention utilizes the circumstance that in motors of the type concerned it is impossible to arrange a stator winding by slipping on, unless the magnetic circuit comprises two or more parts between which air-gaps are inevitably formed. In known embodiments the air-gaps are situated in both the path of the main field and that of the shaded field so that both these fields are affected by the gaps.

According to the invention, the stator circuit is subdivided so that not only the stator windings can be slipped into the pole cores, but also the air-gaps between the parts of this circuit are traversed exclusively by the main field.

According to the invention, this may be achieved, for example, by providing the air-gaps between pole segments for the main field and part of the cross-sections of the pole cores the remaining portions of which is used for the passage of the screened shaded field and leads to a pole-piece comprising a short-circuit winding.

In order that the invention may be readily carried into effect, it will now be described, by way of example, with reference to the accompanying drawing showing a bipolar single-phase motor of the jacket type.

The stator of the motor comprises a jacket or motor core 1 having pole pieces or cores 2 and 3 onto which coils 4 and 5, respectively, are slipped. Only part of each of these cores extends as far as the air-gap between the stator and the rotor (not shown). Short-circuit or shade windings 6 and 7, respectively, are slipped onto the said lengthened parts. Through a flat portion of one of their ends, the pole segments 8 and 9 for the main field engage the parts of the pole cores 2 and 3 which are lengthened only slightly. These ends are profiled and fit into corresponding profiles of the cores. The other ends of the segments 8 and 9 engage the shaded poles of the opposite cores preferably with the interposition of insulating layers 16, 17. When the segments 8 and 9 have been correctly positioned, they may be clamped in these positions by means of pins 10 and 11 of non-magnetic material. The inevitable air-gaps 12 and 13 between the segments 8 and 9 and the cores 2 and 3 now only attenuate the main field without distorting it. The extent of the attenuation may be slightly controlled by providing, if required, a layer of insulating material of suitable thickness in each of the air-gaps 12 and 13 prior to fixing the segments by the pins 10 and 11. The width of the air-gap between the segments 8 and 9 and the rotor and the variation of this width may be controlled by providing a more or less thick layer of insulating material in rounded parts 14 and 15 of the above-mentioned profiles and by a suitable choice of the thickness of the insulating layers 16 and 17 between the segments 8 and 9 and the shaded poles of the opposite cores.

It will be evident that the invention, mutatis mutandis, is also applicable to motors having two or more pairs of poles.

What is claimed is:

1. A self-starting single phase motor comprising a one piece motor core having inwardly projecting opposed pole pieces, a pair of spaced pole segments extending between said pole pieces, a coil on each said pole piece, each said pole piece having a shaded portion extending beyond the associated coil, each said shaded extension having means receiving a pole segment, the remaining pole pieces and associated pole segments forming an air gap over the unshaded portions thereof, said air gaps of the stator circuit being traversed exclusively by the unshaded field of said motor.

2. A self-starting single phase motor comprising a one piece motor core having inwardly projecting opposed pole pieces, a pair of spaced pole segments extending between said pole pieces, a coil on each said pole piece, each said pole piece having a shaded portion extending beyond the associated coil, each said shaded extension having means receiving a pole segment, the remaining pole pieces and associated pole segments forming an air gap over the unshaded portions thereof, said pole segments comprise a semi-circular segment extending from the unshaded portion of one pole piece to the shaded portion of the opposite pole piece, and insulating material interposed at each end of said pole segments, said air gaps of the stator circuit being traversed exclusively by the unshaded field of said motor.

References Cited by the Examiner
UNITED STATES PATENTS 2,251,673  8/41  Gillen _____ 310—172
2,251,674  8/41  Gillen _____ 310—172

MILTON O. HIRSHFIELD, *Primary Examiner.*